(No Model.)
D. B. HAMLET.
WAGON AND CARRIAGE LIFTER.
No. 382,700. Patented May 15, 1888.
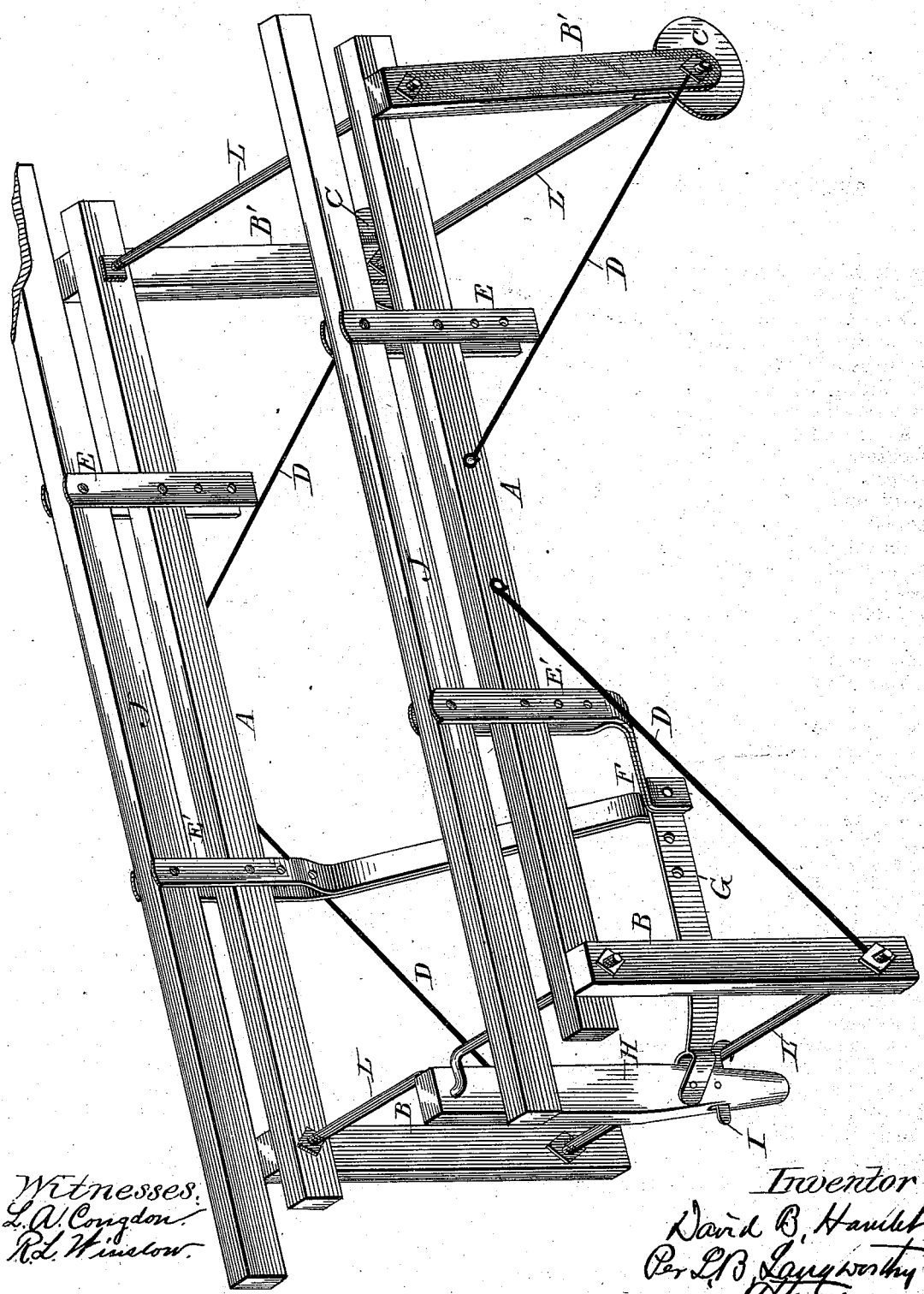
Witnesses
L. A. Congdon
R. L. Winslow
Inventor
David B. Hamlet
Per L. B. Langworthy
Attorney

UNITED STATES PATENT OFFICE.

DAVID B. HAMLET, OF BRISTOL, INDIANA.

WAGON AND CARRIAGE LIFTER.

SPECIFICATION forming part of Letters Patent No. 382,700, dated May 15, 1888.

Application filed December 17, 1887. Serial No. 258,228. (No model.)

*To all whom it may concern:*

Be it known that I, DAVID B. HAMLET, a citizen of the United States, residing at Bristol, in the county of Elkhart and State of Indiana, have invented a new and useful Machine for Lifting Wagons and Carriages, of which the following is a specification.

My invention relates to improvements in machines for lifting wagons and carriages, by means of which a carriage or wagon may be easily and quickly lifted bodily from the ground.

The objects of my improvement are, first, to provide a machine that will easily and speedily lift a carriage or wagon bodily by an application of force acting on an arrangement of levers; second, to provide such a machine that may be readily adjusted to carriages and wagons of different heights; and, third, to provide a machine that may be so folded when not in use that it will occupy but little space. I attain these objects by the mechanism illustrated in the perspective drawing hereunto attached.

A A represent frame supported by folding legs B B and B' B', which are braced by hook-braces D D, and to the legs B' B' are attached the rollers C C. E E and E' E' are parallel couplings attached to frame A A, and J J E' E' extend below frame A A, and, uniting, form lever H. G is a connecting-rod attached at the end by the pivot F and to middle of hand-lever H. I is a dog on hand-lever to hold lever in position.

The mechanism is such that when the hand-lever H is pressed downward the connecting-rod G acts on the pivot F, forcing it back and throwing the couplings E' E' and E E, with attached parallel lifting-bars J J, forward and upward, and when hand-lever reaches brace-rod L, at the lower part of legs B B, the dog I attaches to the rod and holds the lever H securely in position.

In order to adjust the machine to wagons and carriages of different heights the parallel couplings E' E' and E E are so constructed that they may be lengthened or shortened, so as to bring the lifting-bars J J to height desired, and when the couplings are lengthened the connecting-rod G is moved up and attached nearer the fulcrum on hand-lever H.

The couplings E' E', with pivot F, may be placed at either end or in the middle of frame A A, and the connecting-rod G lengthened or shortened to the position in which the lever and coupling are placed.

When the machine is not in use, the hook-braces D D may be unhooked from the legs and rod G detached from pivot F, and the machine compactly folded for storage or transportation.

I am aware that prior to my invention machines for lifting carriages and wagons have been made with a movable lifting-frame raised by crank-levers, and also machines in which the lifting-frame is connected to the stationary frame by coupling-links. Therefore I do not claim such a combination, broadly; but What I do claim as my invention, and desire to secure by Letters Patent, is—

The frame A A, connected with and to the parallel lifting-bars J J by the adjustable parallel couplings E E and E' E', supported by the folding legs B B and B' B', with the rollers C C on legs B' B', pivot F at the union of couplings E' and E', attached to hand-lever H by connecting-rod G, all combined substantially as herein described and set forth.

DAVID B. HAMLET.

Witnesses:
L. A. CONGDON,
R. L. WINSLOW.